US005335816A

United States Patent [19]

Kaufman et al.

[11] Patent Number: 5,335,816

[45] Date of Patent: Aug. 9, 1994

[54] INTERACTIVE MEDICATION DELIVERY SYSTEM FOR MEDICATION PREPACKAGED IN BLISTER PACKS

[75] Inventors: Stephen B. Kaufman, Highland Park; Aleandro DiGianfilippo, Crystal Lake; Tamara L. Sager, Libertyville, all of Ill; Clark F. Bow, Newton; Ralph J. DeVito, Stanhope, both of N.J.

[73] Assignee: HealthTech Services Corporation, Northbrook, Ill.

[21] Appl. No.: 919,625

[22] Filed: Jul. 24, 1992

Related U.S. Application Data

[63] Continuation of Ser. No. 784,664, Oct. 24, 1991, abandoned, which is a continuation of Ser. No. 415,085, Sep. 29, 1989, abandoned.

[51] Int. Cl.[5] .......... B65G 59/00

[52] U.S. Cl. .......... 221/13; 221/21; 221/124; 221/129; 221/195; 221/270

[58] Field of Search .......... 221/2, 3, 13, 21, 123, 221/124, , 129, 131, 133, 191, 192, 195, 197, 198, 232, 238, 268, 270, 274, 287, 243, 281

[56] References Cited

U.S. PATENT DOCUMENTS

| | | | |
|---|---|---|---|
| 3,369,697 | 2/1968 | Glucksman et al. . | |
| 3,395,829 | 8/1968 | Cogdell et al. . | |
| 3,651,984 | 3/1972 | Redenbach | 221/3 |
| 3,722,739 | 3/1973 | Blumberg | 221/3 |
| 3,762,601 | 10/1973 | McLaughlin | 221/154 |
| 3,815,780 | 6/1974 | Bauer | 221/15 |
| 3,857,383 | 12/1974 | Sommerfield et al. . | |
| 3,911,856 | 10/1975 | Ewing . | |
| 3,917,045 | 11/1975 | Williams et al. . | |
| 3,964,638 | 6/1976 | Diamauro | 221/3 |
| 3,968,900 | 7/1976 | Stambuk | 221/3 |
| 3,998,356 | 12/1976 | Christensen | 221/2 |
| 4,000,831 | 1/1977 | House | 221/232 X |
| 4,034,740 | 7/1977 | Atherton et al. . | |
| 4,034,757 | 7/1977 | Glover . | |
| 4,130,881 | 12/1978 | Haessler et al. . | |
| 4,207,992 | 6/1980 | Brown . | |
| 4,223,801 | 9/1980 | Carlson | 221/3 |
| 4,227,526 | 10/1980 | Goss . | |
| 4,258,354 | 3/1981 | Carmon et al. . | |
| 4,275,384 | 6/1981 | Hicks et al. . | |
| 4,360,125 | 11/1982 | Martindale et al. . | |
| 4,361,408 | 11/1982 | Wirtschafter . | |
| 4,367,955 | 1/1983 | Ballew . | |
| 4,382,688 | 5/1983 | Machamer . | |
| 4,419,016 | 12/1983 | Zoltan . | |

(List continued on next page.)

FOREIGN PATENT DOCUMENTS

| | | | |
|---|---|---|---|
| 50793 | 4/1977 | Japan | 221/21 |
| 523815 | 7/1940 | United Kingdom | 221/232 |

OTHER PUBLICATIONS

Pending Patent Application (Ser. No. 07/201,779) filed Jun. 2, 1988; Kaufman et al.

Comarchero et al., "*A Micro-Computer Based System for the Management of the Critically Ill*", 1978.

Blum et al., "*Protocol Directed Patient Care Using a Computer*" (1980).

Rodhard et al., "*A Data Mangement Program to Assist with Home Monitoring of Blood Glucose and Self Adjust-*

(List continued on next page.)

*Primary Examiner*—David H. Bollinger

*Attorney, Agent, or Firm*—Ryan, Kees & Hohenfeldt

[57] ABSTRACT

A dispensing device has a storage compartment for holding one or more of the medication containers. The compartment has an opening. A push member moves in a path aligned with the opening between a first position, spaced from the opening, and a second position, adjacent the opening. A first mechanism moves one container held within the compartment into the path as the push member is moved from its second position toward its first position. The push member, when subsequently moved from its first position toward its second position, ejects the one container in the path from the compartment through the opening. The first mechanism also serves to move another container held within the compartment into the path after the one container is ejected and the push member is moved from its second position back toward its first position.

7 Claims, 9 Drawing Sheets

U.S. PATENT DOCUMENTS

| | | | |
|---|---|---|---|
| 4,448,541 | 5/1984 | Wirtschafter . | |
| 4,473,884 | 9/1984 | Behl . | |
| 4,483,626 | 11/1984 | Noble . | |
| 4,490,711 | 12/1984 | Johnston . | |
| 4,504,153 | 3/1985 | Schollmeyer et al. . | |
| 4,526,474 | 7/1985 | Simon . | |
| 4,572,403 | 2/1986 | Benaroya . | |
| 4,573,606 | 3/1986 | Lewis et al. . | |
| 4,600,119 | 7/1986 | Olson | 221/197 X |
| 4,616,316 | 10/1986 | Hanpeter et al. . | |
| 4,674,651 | 6/1987 | Scidmore et al. | 221/3 |
| 4,674,652 | 6/1987 | Aten et al. | 221/3 |
| 4,695,954 | 9/1987 | Rose et al. . | |
| 4,712,562 | 12/1987 | Ohayon et al. . | |
| 4,725,997 | 2/1988 | Urquhart et al. . | |
| 4,731,726 | 3/1988 | Allen, III . | |
| 4,776,016 | 10/1988 | Hansen . | |
| 4,803,625 | 2/1989 | Fu et al. . | |
| 4,872,591 | 10/1989 | Konopka | 221/3 |
| 4,933,873 | 6/1990 | Kaufman et al. . | |
| 5,036,462 | 7/1991 | Kaufman et al. . | |
| 5,084,828 | 1/1992 | Kaufman et al. . | |
| 5,102,008 | 4/1992 | Kaufman et al. . | |
| 5,126,957 | 6/1992 | Kaufman et al. . | |
| 5,142,484 | 8/1992 | Kaufman et al. . | |
| 5,148,944 | 9/1992 | Kaufman et al. . | |
| 5,197,632 | 3/1993 | Kaufman et al. . | |

OTHER PUBLICATIONS

*ment of Insulin Dosage For Patient with Diabetes Mellitus and Their Physicians*" (1984).

Kouchoukos et al., "*Automated Patient Care Following Cardiac Surgery*" (1971).

Hudson et al. "*Microcomputer-Based Expert System for Clinical Decision-Making* " (1981).

Worthman et al. "*Quality Assessment in Emergency Medical Services Systems: The Criteria Mapping Method*" (1979).

Greenfield et al. "*The Clinical Investigation and Management of Chest Pain in an Emergency Department*" (1977).

Sanders et al. "*Micro-Computer Controlled Care System for the Severely Physically Impaired*" (1984).

INTERACTIVE MEDICATION DELIVERY SYSTEM FOR MEDICATION PREPACKAGED IN BLISTER PACKS

This is a continuation of copending application Ser. No. 07/784,664, filed on Oct. 24, 1991, now abandoned, which is a continuation of application Ser. No. 07/415,085, filed Sep. 29, 1989, abandoned.

FIELD OF THE INVENTION

The invention generally relates to systems for dispensing medications. In a more particular sense, the invention concerns systems which oversee and coordinate the administration of complex medication regimens at home, outside the support system of a hospital or pharmacy, and without the day to day supervision of medical personnel. In this more particular sense, the invention also concerns automated home care patient health monitoring systems.

BACKGROUND OF THE INVENTION

Due to advances in medicine and medical treatments in general, people are living longer. As a result, the number and percentage of older people are growing in the United States and elsewhere.

However, despite medical advances, many elderly people still face chronic and debilitating health problems. Arthritis, hypertension, and heart conditions are but a few examples of the problems associated with longevity.

Treatment of these health problems often requires close compliance with relatively complex medication regimes. It is not unusual for a person having one of the above health problems to be taking four or more different prescription drugs at one time. These drugs often differ significantly in dosages, both as to time and amount, as well as in their intended physiological effects. These drugs also often differ in the severity of potentially adverse reactions due to mismedication.

Close and careful compliance with these complex medication regimes is a difficult task in itself. The difficulty is greatly enhanced, considering that the elderly must discipline themselves to follow these regimes at home, without the day-to-day support and supervision of trained hospital and pharmacy personnel, and often without the day-to-day support and supervision of their immediate families or other caregivers. Furthermore, a loss in short term memory can be naturally attributed to the aging process and to the medication themselves, resulting in forgetfulness and further confusion in scheduling compliance with complicated medication regimes.

The elderly are therefore increasingly at risk of hospitalization or death from mismedication.

An interactive patient assistance device, ideally suited to the needs of home care patients—young and old alike—is described in Kaufman et al. U.S. patent application Ser. No. 201,779 (filed Jun. 2, 1988). The device includes a self-contained medication delivery mechanism and self-contained physical testing apparatus. The device normally retains the medication and the testing apparatus away from access by the patient. Both medication and the testing apparatus are made available to the patient, either in response to a prescribed schedule or in response to a verbal con, hand made by the patient.

The present invention enhances and expands the flexible, interactive system described in the Kaufman et al. application.

The invention is directed to improving the overall well-being and lifestyle of home care patients who are on complicated medication regimes. The invention addresses the problems of compliance with a complicated regime of differing medications and solves these problems by providing a reasonable degree of self-sufficiency and personal control over the administration of medication without sacrificing the overall therapeutic objectives of the prescribed medical treatment.

SUMMARY OF THE INVENTION

The invention provides a dispensing device and related systems for administering medication prepackaged in sealed containers. These containers are commonly referred to as "blister packs."

The dispensing device comprises a storage compartment for holding one or more of the medication containers. The compartment has an opening. A push member moves in a path aligned with the opening between a first, or retracted, position, spaced from the opening, and a second, or extended, position, adjacent the opening.

The dispensing device includes a first mechanism that moves one of the containers held within the compartment into the path as the push member is moved from its extended position toward its retracted position. The push member, when subsequently moved back toward its extended position, ejects the one container in the path through the opening.

In a preferred embodiment, after ejecting the one container, another container held within the compartment is moved into the path as the push member is moved from its extended position back toward its retracted position.

Also in a preferred embodiment, the compartment holds a number of containers in an adjacent relationship. The one container that is aligned with the opening occupies the first position within the relationship. In this arrangement, the one container rests against a fixed wall, and the container that occupies the last position within the relationship rests against a movable wall. The movable wall is urged toward the fixed wall, thereby urging all the containers ,within the relationship toward the first container, and thus toward the opening itself.

Another aspect of the invention provides a dispensing system for medication prepackaged in sealed containers. The system includes a housing in which at least two medication storage devices are located. Each storage device including a storage compartment, as just described, that holds one or more of the medication containers. At least two medication dispensing mechanisms, one associated with each storage device, are also located within the housing. Each dispensing mechanism includes a push member and first mechanism as above described. In accordance with this aspect of the invention, the individual storage compartments can be selectively removed and returned within the housing for replenishment and replacement.

In a preferred arrangement, the storage compartment and its associated delivery device comprise an integral unit that can be selectively removed and returned to the housing.

Another aspect of the invention provides a medication delivery system comprising a housing in which separate first and second medication dispensing and delivery devices are located. At least one of the dispensing and delivery devices contains medication prepacked in sealed containers, as above described. In this arrangement, a system control element actuates the delivery device associated with the first storage device in response to a first medication criteria and actuates the delivery device associated with the second storage device in response to a second medication criteria different from the first medication criteria.

Other features and advantages of the invention will become apparent upon reviewing the following detailed description, drawings, and appended claims.

DESCRIPTION OF THE PREFERRED EMBODIMENTS

Figure 1:
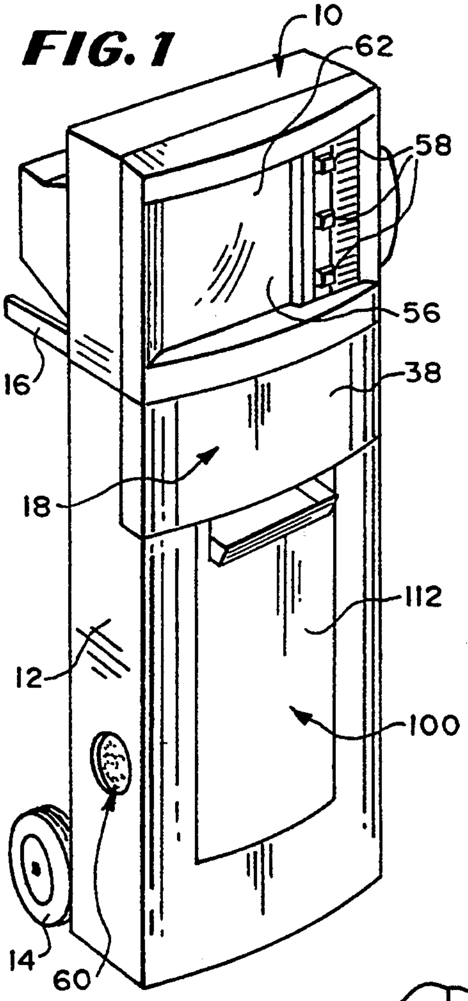
FIG. 1 is a front perspective view of a patient monitoring and assistance device having an enclosed system for delivering physical testing devices to the patient (shown in its closed position), as well as an enclosed system that embodies the features of the invention for storing and dispensing medication in individual blister packs.

An interactive monitoring and assistance device 10 is shown in FIG. 1. As will soon be described in greater detail, the device 10 performs as a self-contained, microprocessor-based caregiver who, in a friendly and supportive manner, monitors, manages and assists a patient in performing everyday health maintenance tasks. In carrying out its tasks, the device 10 monitors the patient's vital signs. The device 10 also stores and administers medication. The device 10 preferably is linked to a central facility that provides round-the-clock supervision and response as required.

The device 10 includes a housing or cabinet 12 that, in a preferred design, stands about four feet tall. Preferably, the housing 12 is portable. For this purpose, the device 10 includes wheels 14 and a handle 16 for the patient, or another user, to guide the movement.

Figure 2:
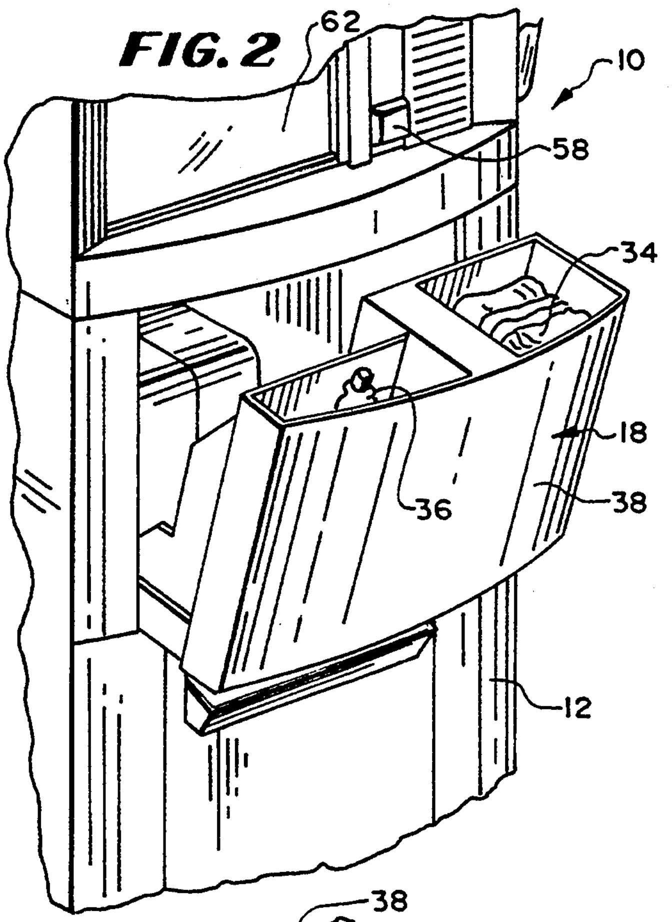
FIG. 2 is an enlarged front perspective view of a portion of the device shown in FIG. 1, with the testing device delivery system shown in its open position.

As shown in FIGS. 1 and 2, the device 10 houses a system 18 for storing and delivering one or more devices for testing the vital signals of a patient. The device 10 also houses a system 100 for storing and administering medication (see FIG. 3 also).

Figure 4A:
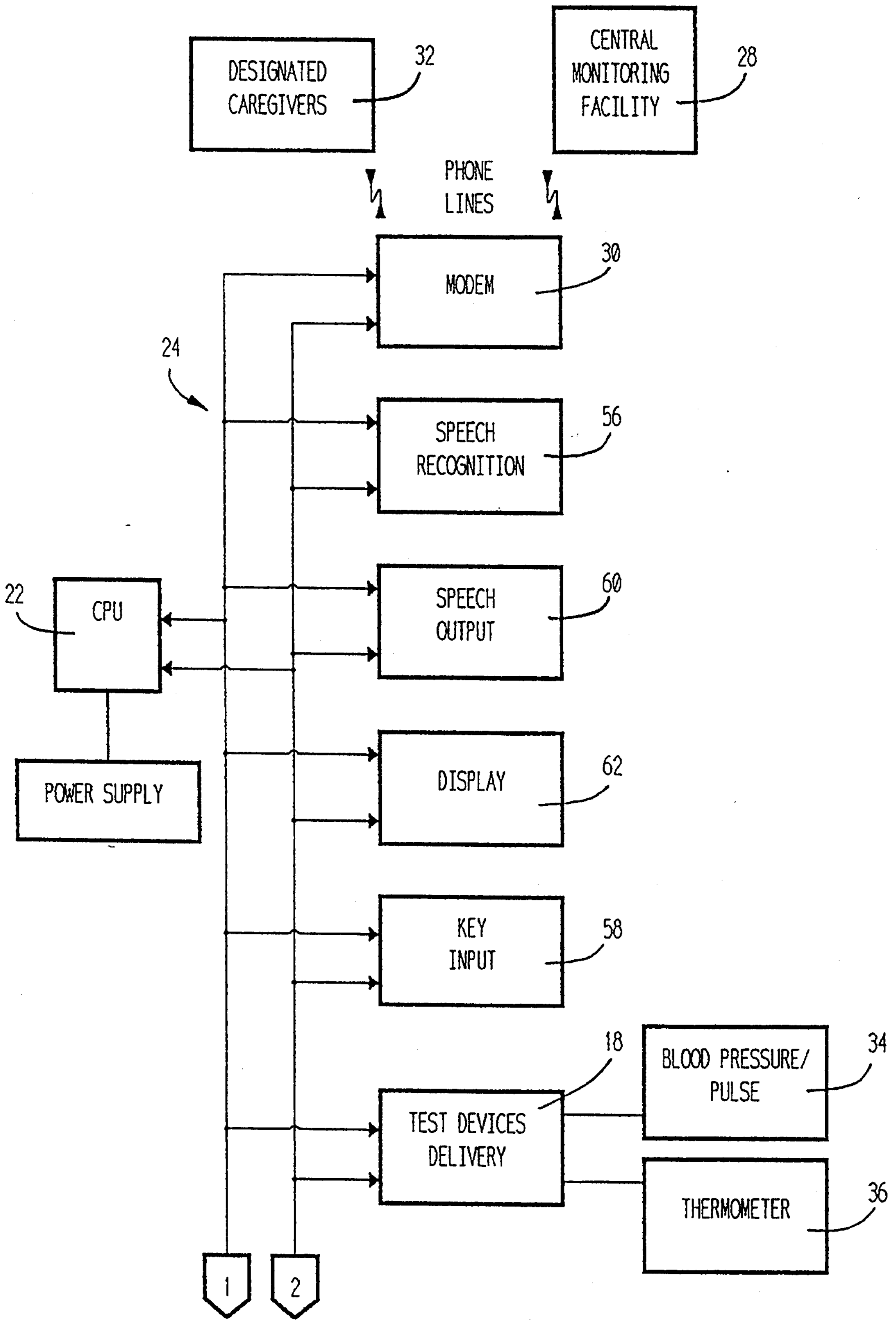
FIGS. 4*a* and 4*b*, collectively referred to hereinafter as FIG. 4, are a schematic block diagram of the system that controls the operation of the patient assist device shown in FIG. 1.
Figure 4B:
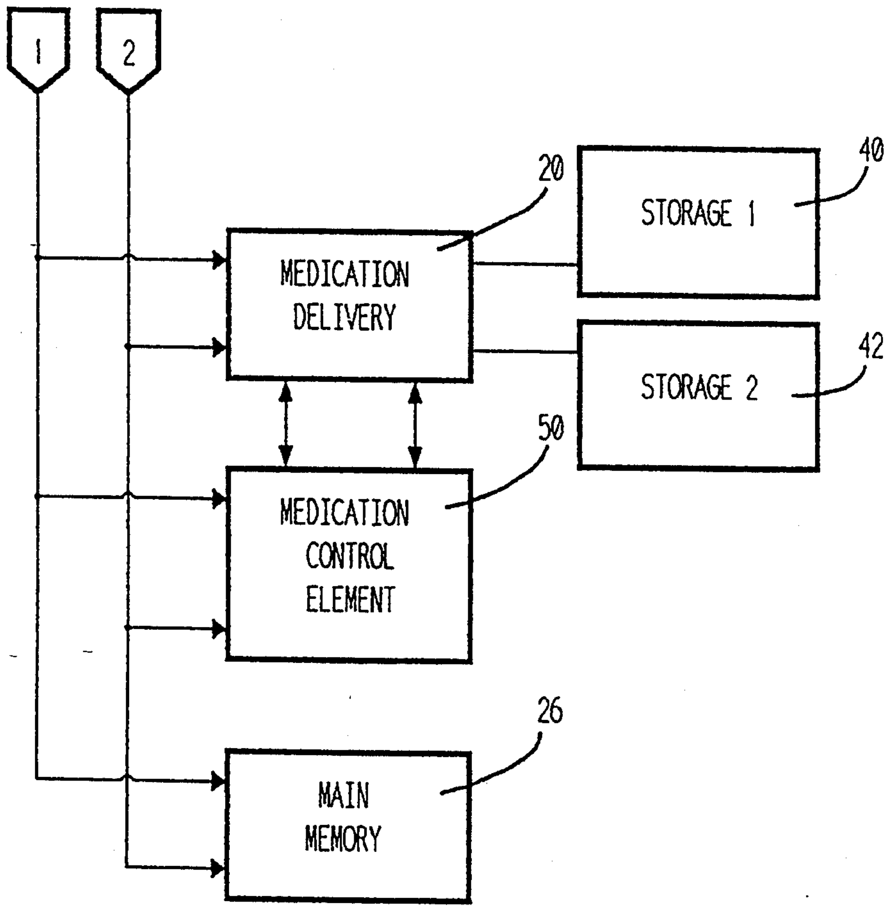
Figure 5:
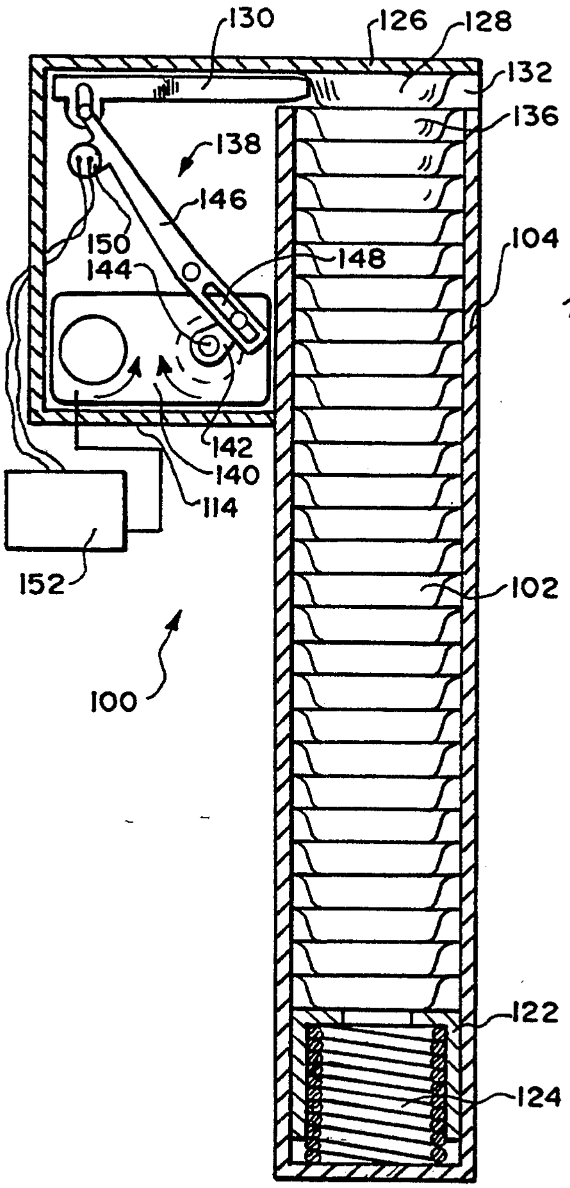
FIGS. 5 to 8 are enlarged side views, taken generally along line 5—5 of FIG. 3, showing the sequence of operation in dispensing medication in blister packs.
Figure 6:
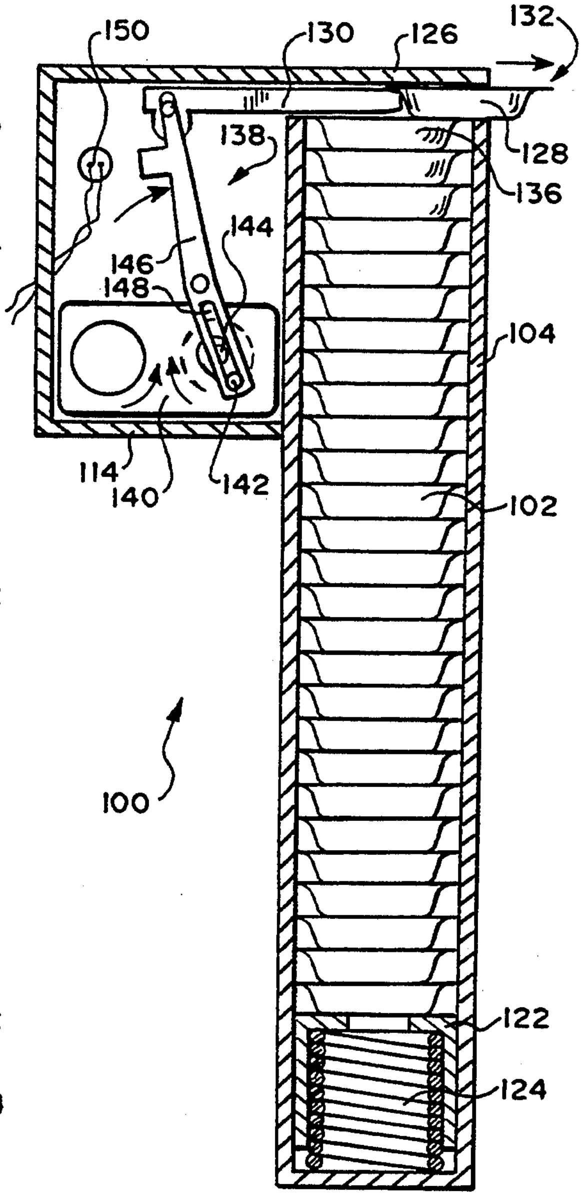
Figure 7:
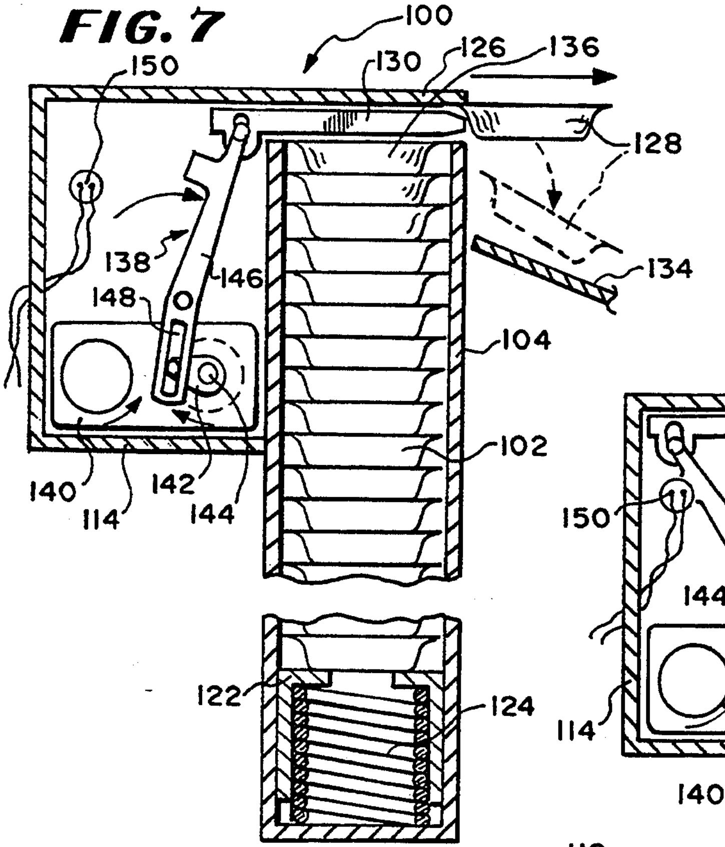

In the illustrated and preferred embodiment shown in FIG. 4, the device 10 houses a main microprocessor-based CPU 22 that coordinates and controls its operation. While various arrangements are possible, the CPU 22 preferably comprises an IBM PC compatible CPU board that accommodates multi-tasking sequences. Various input/output (I/O) devices communicate with the main CPU 22 through conventional data and address busses 24. The I/O devices will be described in greater detail later. A mass storage device 26 for storing digital information also communicates with the main CPU 22 through the busses 24.

In use, as shown in FIG. 4, the device 10 is preferably linked with a central monitoring facility 28 by a modem 30 that communicates with the main CPU 22 through the busses 24. Health care professionals are present on a twenty-four hour basis at the central facility 28 to monitor the health of the patient based upon information collected and transmitted to them by the device 10. The device 10 is also preferably linked via the modem 30 with selected individuals 32—typically close friends, family members, or other designated caregivers—who are automatically notified by the device 10 when certain health conditions exist or upon request by the patient or central facility 28. As can be seen, the device 10 is a central part of an overall support system for the patient.

As shown in FIG. 2, the system 18 for monitoring the patient's vital signs includes two physical testing devices: a pressure cuff 34 for measuring blood pressure and pulse rate, and a thermometer 36 for measuring body temperature. Of course, other testing devices could be provided, depending upon the health condition of the patient and mode of treatment.

As shown in FIG. 4, the testing devices 34 and 36 communicate with the main CPU 22 through the busses 24. The measurements taken are stored in the data storage device 26. These measurements are also periodically transmitted to the central monitoring facility 28 by the modem 30. The central facility 28 also preferably records received information in its own mass storage device for record keeping, retrieval and analysis.

Preferably, the testing devices 34 and 36 are housed in a movable compartment or drawer 38 within the housing 12. The drawer 38 is normally closed (as shown in FIG. 1), thereby retaining the testing devices 34 and 36 within the housing 12 away from access by the patient. The drawer 38 will open in response to an appropriate command signal received and interpreted by the main CPU 22. The opened position for the drawer 38 is shown in FIG. 2. The testing devices 34 and 36 are thereby made available for use by the patient. This particular operation will be described in greater detail later.

The medication delivery system 100 housed within the device 10 (see FIG. 3) embodies the features of the invention. The system 100 is capable of storing and administering different types of medications in prepacked packets or containers 102 (commonly called "blister packs") having different administration criteria. The criteria can differ in terms of prescribed dosage amount, prescribed frequency of administration, degree of accessibility to the patient, or various combinations of the above.

Figure 9:
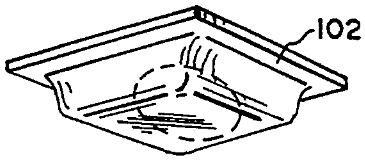
FIG. 9 is an enlarged perspective view of a blister pack that is dispensed by the system shown in FIGS. 5 to 8.

A representative construction of one of the packets 102 is shown in FIG. 9. The blister packs 102 are typically prepared by a pharmacy or drug distributor. They can contain dosages of all the medications prescribed to be taken at a given administration time. They also can contain an individual medication dose. By using sealed blister packs, the administration of multiple dosages of different medications is simplified for the patient, and the "shelf life" of the medication is lengthened.

Figure 10:
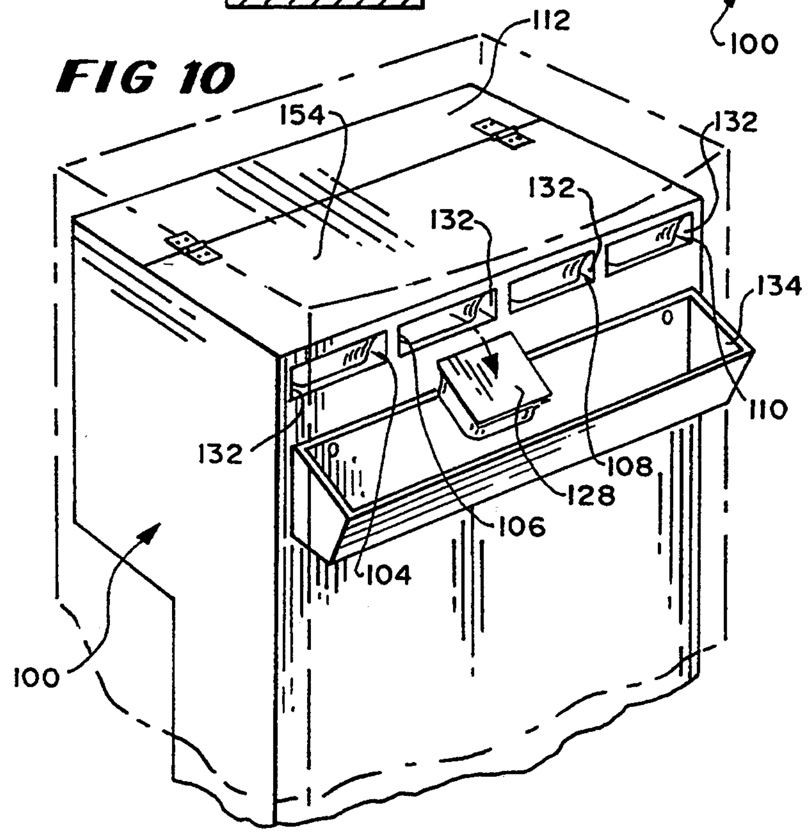
FIG. 10 is an enlarged front perspective view of the system shown in FIGS. 5 to 8, as a blister pack is being dispensed for administration to a patient.

The system 100 includes discrete medication storage compartments (see FIGS. 10 and 11), each being capable of separately storing at least one (and preferably more) blister packs 102 for administration to the patient. In the illustrated embodiment, there are a total of four storage compartments 104/106/108/110 associated with the system 100. Of course, more or less compartments may be present, depending upon the intended use of the system 100. Each compartment 104/106/108/110 is capable of holding about 30 individual blister packs 102 in an adjacent relationship. In the illustrated embodiment, the blister packs 102 are vertically stacked.

Figure 3:
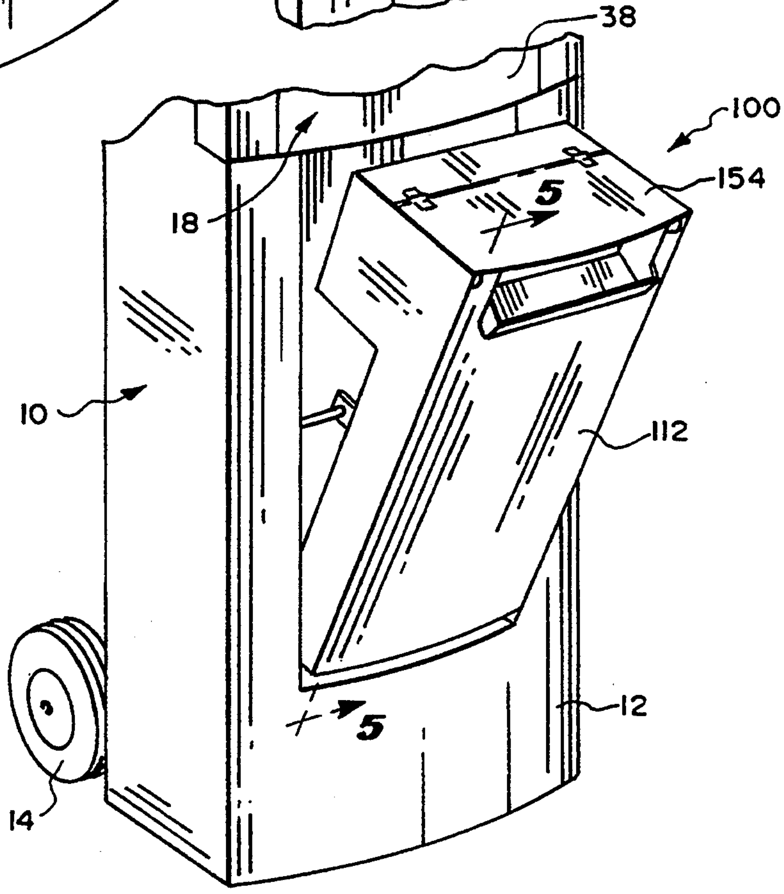
FIG. 3 is an enlarged front perspective view of a portion of the device shown in FIG. 1, with the associated medication delivery system tipped outwardly from the front for replenishment of medication.

In the illustrated embodiment, the compartments 104/106/108/110 are enclosed in a housing 112 that is mounted in the lower part of the patient assistance device 10 (see FIGS. 1 and 3), below the movable drawer 38 associated with the physical testing system 18. The housing 112 can be tilted out from the device 10 (as shown in FIG. 3) for service and to load medication into the system 100.

The medication delivery system 100 includes four separate medication delivery means or mechanisms 114/116/118/120, one associated with each storage compartment, respectively 104/106/108/110 (see FIGS. 5 to 8 and 11). Each delivery mechanism 114/116/118/120 is individually controlled by a selected control element in response to a prescribed control signal or signals, as will be described in greater detail later.

Each delivery mechanism 114/116/118/120 is identical in construction, so only one (mechanism 114) will be described in detail.

As shown in FIGS. 5 to 8, the delivery mechanism 114 includes a movable wall 122 located at the bottom of the associated compartment 104. The bottom wall 122 is movable vertically (up and down, as shown in the drawings) within the compartment 104. A spring 124 normally urges the bottom wall 122 in an upward direction (that is, toward the top 126 of the compartment 104). The entire vertically stacked arrangement of blister packs is thereby urged toward the top 126 of the associated compartment 104.

The uppermost blister pack carried in this upwardly biased arrangement (designated by reference numeral 128) lies in the path of lateral movement of an associated push bar 130. Lateral movement of the push 130 bar toward an extended position into the compartment 104 (which, in the drawings, is in a forward direction toward the right) will eject the uppermost blister pack 128 out of a slot 132 along the top 126 of the compartment 104. This can be best seen in FIGS. 18 and 19. The ejected blister pack 128 falls into a dispensing chute 134 (see FIG. 10) that extends outside the assistance device 10 for patient access.

Subsequent lateral movement of the push bar 130 toward a retracted position outside the compartment 104 and away from the slot 132 (which, in the drawings, is in a rearward direction toward the left) allows the next adjacent blister pack (designated by numeral 136) to be urged upwardly by the spring 124 into contact with the top wall 126, thereby assuming the uppermost position in the compartment 104. This can be best seen in FIG. 8.

A linkage assembly 138 couples each push bar 130 to an associated electric motor 140 to drive the push bar 130 laterally forward and backward in the manner just described. While the construction of the linkage assembly 138 may vary, in the illustrated embodiment, it includes a rotating crank 142 coupled to the drive shaft 144 of the associated motor 140. A link 146 is mounted to a pivot axle for movement between a forward pivot position (shown in FIG. 7) and a rearward pivot position (shown in FIGS. 5 and 8). The push bar 130 is attached to the far end of the link 146, such that forward and rearward pivotal movement of the link 146 imparts lateral forward and backward movement to the push bar 130, as above described (and as can be seen in FIGS. 5 to 8). The other end of the link 146 includes a slot 148 engaged by the rotating crank 142. Rotation of crank 142 thereby imparts forward and rearward pivotal movement to the link 146 which, in turn, imparts the forward and rearward lateral movement to the push bar 130.

Figure 8:
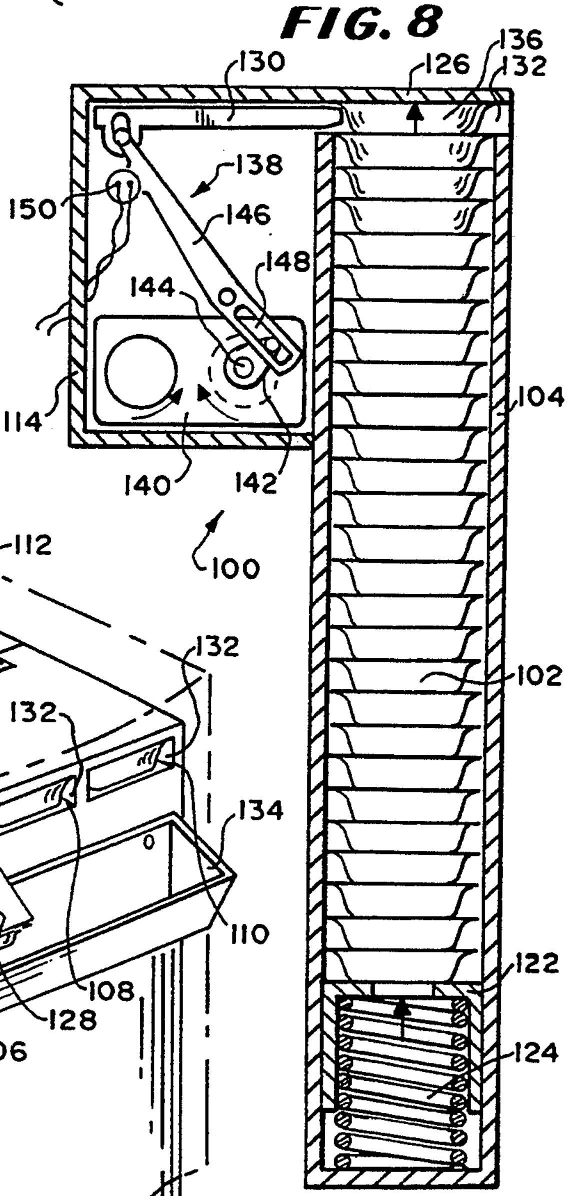

In particular, as shown in FIGS. 5 to 8, one full revolution (360-degrees) of the crank 142 will cycle the push bar 130 from its rearwardmost position (FIG. 5) into its forwardmost position (FIG. 7) and back to its rearwardmost position (FIG. 8). The uppermost blister pack 128 is ejected during each cycle, and the next blister pack 136 is moved upwardly by the spring 124 to take its place for dispensing during the next cycle.

Means is provided for sensing when forward movement of the push bar 130 obstructed. This could happen, for example, should the uppermost blister pack 128 become wedged in the slot 132. In the illustrated embodiment, a proximity switch 150 senses when the link 146, and thus the push bar 130, are in their rearwardmost position. Timing means 152 (see FIG. 5) is activated when a "Start" control signal is sent to the motor 140. The timing means 152 automatically deactivates the motor 140 if the link 146 does not break contact with the proximity switch 150 within a predetermined period of time.

In the illustrated and preferred embodiment (see FIG. 11), each storage compartment 104/106/108/108 with associated delivery mechanism 114/116/118/120 can be individually removed from the housing 112 as a self contained module for replenishment of the medication. A portion of the top wall of the housing 112 is hinged, forming a door 154 to allow access to any one of the modular compartments 104/106/108/110 when the housing 112 is tilted outward. An electrical power cable 156 coupled to the associated delivery mechanism can be unplugged to permit removal.

Figure 11:
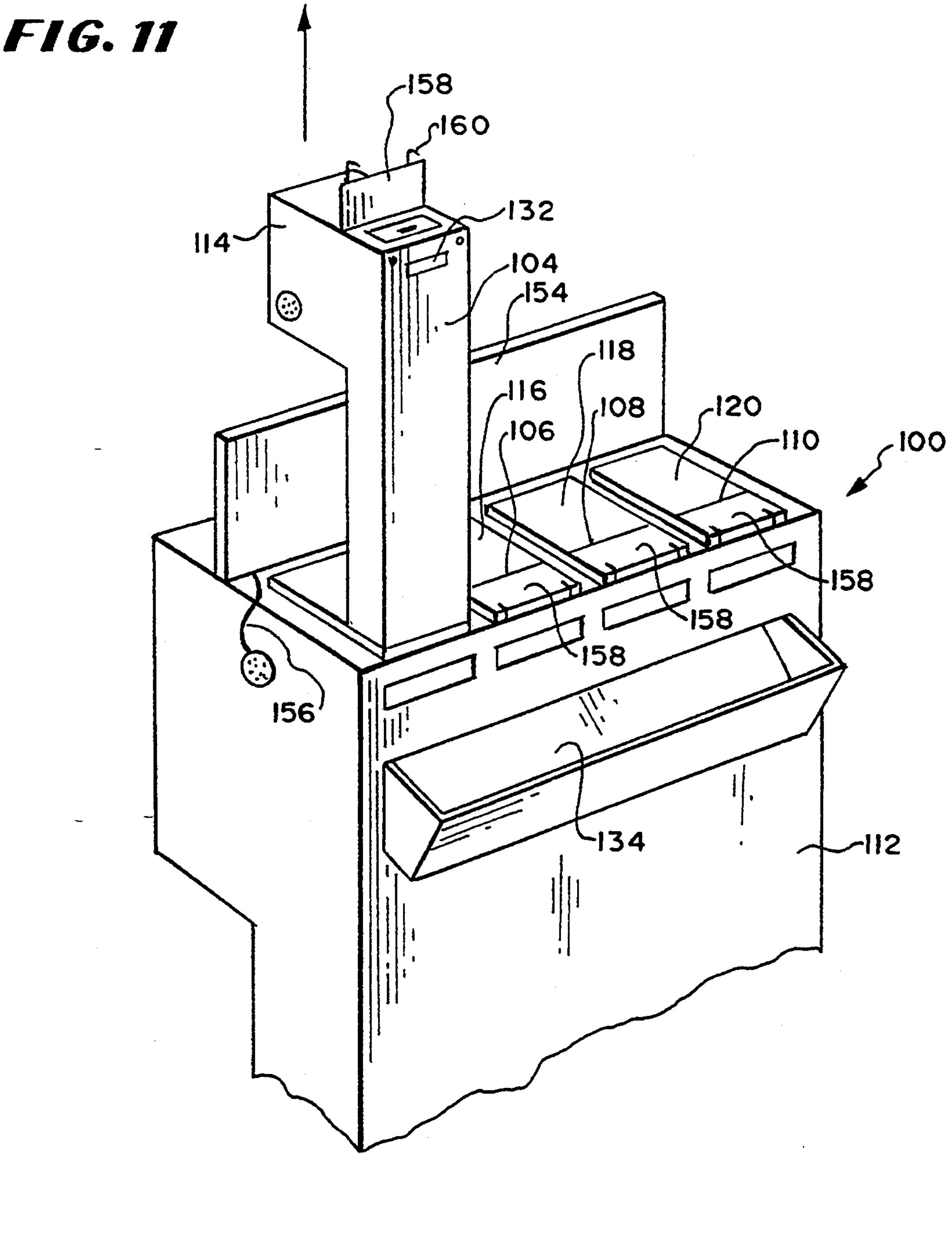
FIG. 11 is a front perspective view of the medication delivery system shown in FIG. 10, as opened to permit replenishment of the storage compartments in modular form.

Medication in blister pack form can be manually loaded into each compartment 104/106/108/110 through a hinged top cover member 158 with an associated latching mechanism 160 (see FIG. 11). It is contemplated that the modular compartments will be prepacked by trained medical or pharmacy personnel at a remote location and then carried on site.

The removable, interchangeable modular design of each compartment and its associated delivery mechanism (best shown in FIG. 11) simplifies a change in medication brought about by a change in the prescribed medication regime.

Figure 12:
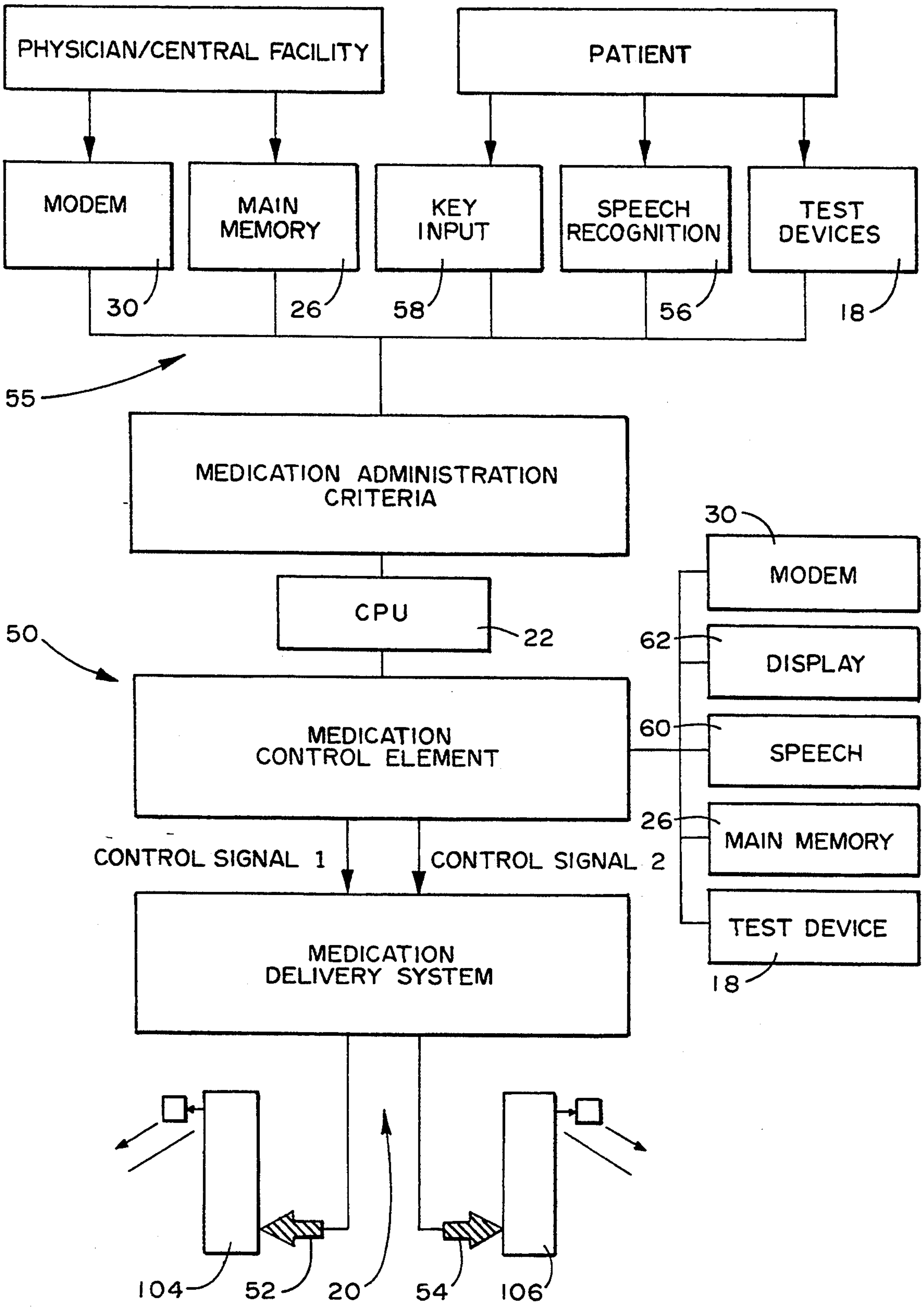
FIG. 12 is a schematic and partially diagrammatic block diagram of the elements of the system shown in FIG. 4 that control the operation of the medication delivery system that incorporates the invention.

The medication delivery system 100 includes a control means or element 50 associated with the medication delivery mechanisms 114/116/118/120 (see FIG. 12). For the purposes of discussion, the interaction of the control element 50 with two of the delivery mechanisms 114 and 116 will be detailed.

In the illustrated and preferred embodiment, the control element 50 communicates with the main CPU 22 (see FIG. 4, too), either in the form of programmable random access memory (RAM) or as preprogrammed read only memory (ROM).

According to its programming, the control element 50 is capable of receiving and differentiating between at least two different prescribed inputs. Upon the receipt and interpretation a first prescribed input or combination of inputs, the control element 50 will generate a control signal 52 that actuates the first delivery mechanism 114. Upon receipt of the second prescribed input or combination of inputs different from the first input, the control element 50 will generate a control signal 54 that actuates the second delivery mechanism 116. The control element 50 will not actuate the first delivery mechanism 46 in response to the second prescribed input.

Because the first and second control signals 52 and 54 are generated in response to different prescribed input criteria, the medications stored in the two storage compartments 104 and 106 can be selectively administered differently.

As best shown in FIG. 12, the input criteria that generate the first and second control signals are derived from both external and internal devices 55 associated with the medication delivery system 20. These devices receive input from internal memory 26, the physician (or healthcare professional), and the individual patient.

More particularly, the system 20 includes in internal memory 26 one or more prescribed schedules for administering medication. Here, the attending physician records the medication regime he or she has prescribed for the patient.

The system 20 also includes various external input devices for receiving and interpreting prescribed commands either from the patient or from the central monitoring facility 28. These external input devices communicate with the control element 50 through the main CPU 22 (see FIG. 4). The received commands can include one or more specified commands for administering medication "upon demand".

In the illustrated and preferred embodiment shown in FIGS. 4 and 12, the external input devices include a speech recognition system 56 for receiving and interpreting preselected verbal commands made by the patient (for example, by using a Texas Instruments Recognition and Speech Unit Model TI-2245186-001). The external input devices also include the modem 30 for receiving and interpreting preselected commands from the central facility 28.

In addition, the external input devices preferably include one or more input buttons or keys 58 located at a user-convenient place on the housing 12. The keys 58 allow the patient to manually enter the prescribed medication delivery commands, if desired. In the illustrated and preferred embodiment shown in FIGS. 1 and 2, only a select few input keys 58 for entering block (or macro-) commands are provided. This arrangement simplifies the patient's interface with the device 10. However, it should be appreciated that a full keyboard could also be included, depending upon the degree of sophistication and desires of the patient.

In the illustrated and preferred embodiment shown in FIGS. 4 and 12, the system also includes an external output device associated with the main CPU 22 for delivering messages or otherwise communicating with the patient. Preferably, the external output device includes a speech generation system 60 for generating audible messages to the user. The speech generation system 60 can take the form of either a conventional device that synthesizes speech or a conventional device that digitizes prerecorded speech.

In addition, the external output device also preferably includes a video monitor 62 on which the audible messages appear in written form (see FIG. 1). In this arrangement, the video monitor 62 can also display in written form the preselected medication administration commands. In this way, the video monitor 62 serves to visually back up and confirm the verbal messages and commands being exchanged by the patient and the device 10, thereby minimizing the chance of misunderstandings or failures to communicate.

Due to these various input and output devices, the medication delivery system 20 as just described affirmatively interacts with the patient, relying upon both spoken and written forms of communication with the patient.

For example, the control element 50 as above described can store and selectively administer one category of medication that should be administered only according to a prescribed schedule and another category of medication that can be administered upon demand by the patient.

Figure 13A:
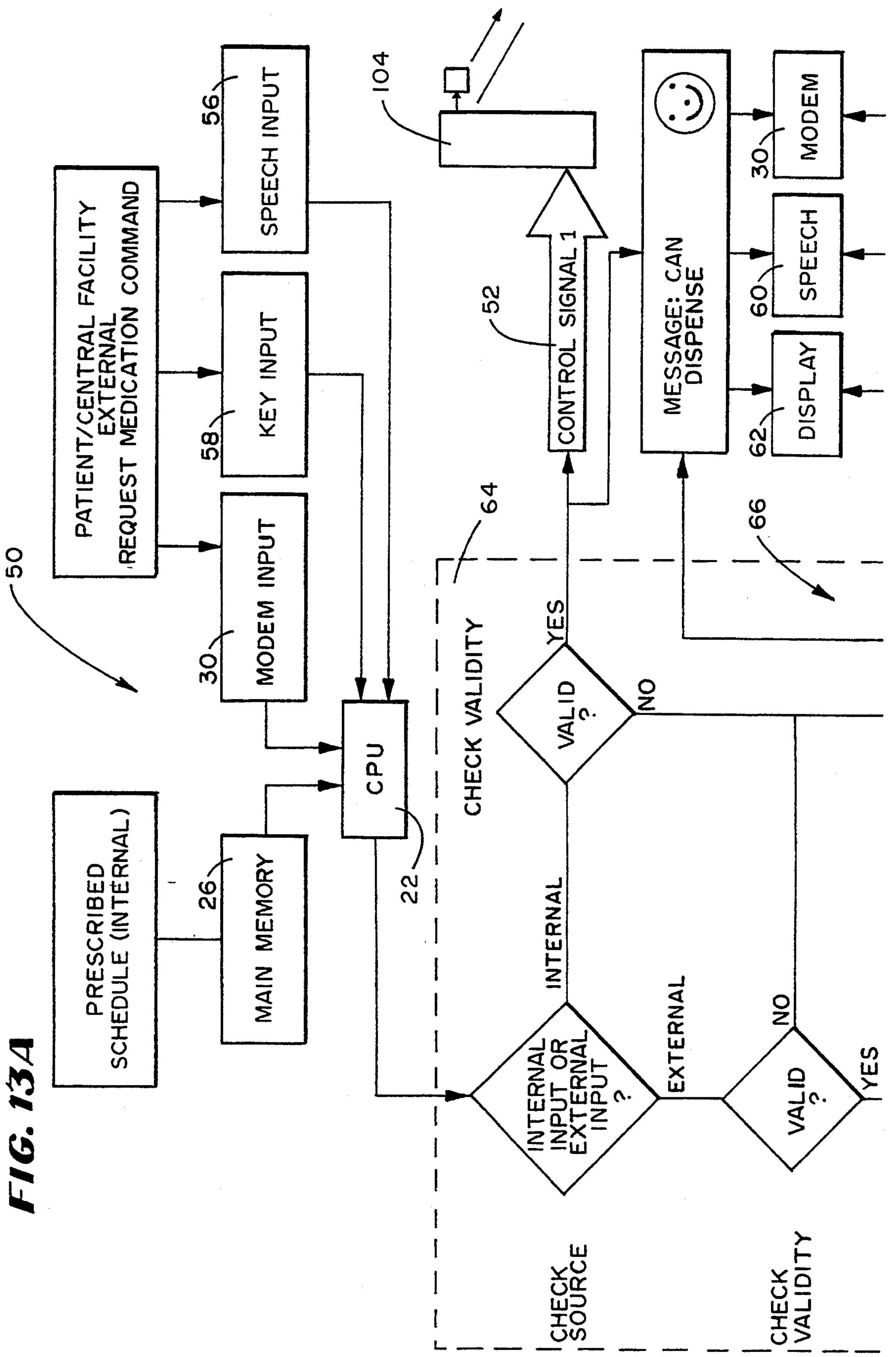
FIGS. 13*a* and 13*b*, collectively referred to hereinafter as FIG. 13, are a schematic and partially diagrammatic flow chart of an embodiment of the system for controlling the operation of the medication delivery system that incorporate aspects of the invention.
Figure 13B:
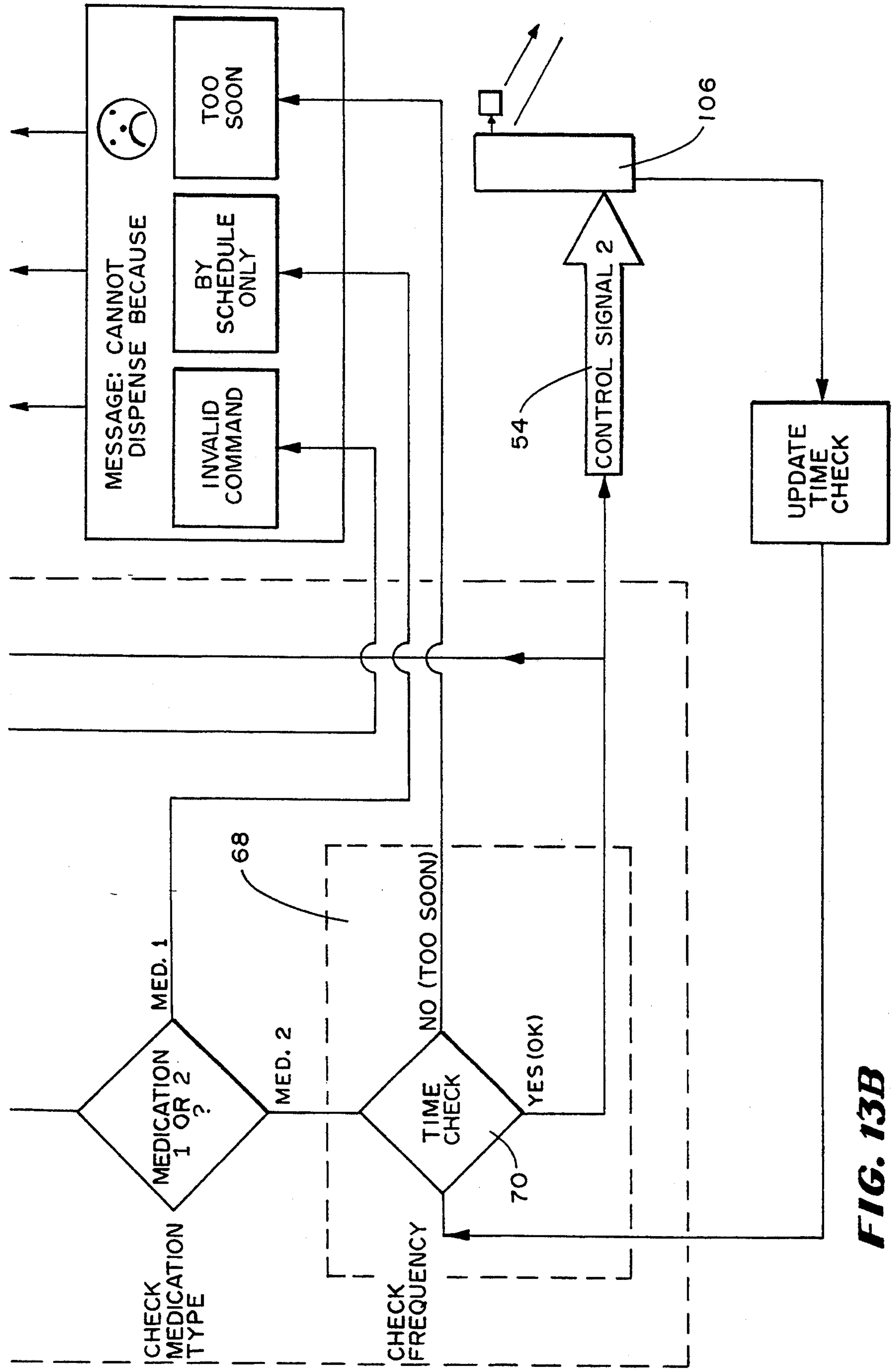

The control element 50 associated with this arrangement is shown diagrammatically in FIG. 13. The prescribed medication schedule is retained in the internal memory 26. The control element 50 includes a first operative sequence 64 that will generate the first control signal 52 upon receiving a valid administer medication command from an internal source (that is, a command generated internally based upon preprogrammed considerations). In the illustrated embodiment, the appropriate administer medication command is internally issued periodically by the CPU 22, based upon a continuous real time monitoring of the prescribed medication schedule stored in the internal memory 26.

Upon generation of the first control signal 52, medication retained in the first storage compartment 104, and only the first storage compartment 104, will be released to the patient.

Preferably, the first operative sequence 64 also generates a "Can Administer" message, using one or more of the output devices (the speech generator 60 and/or the display 62), advising the patient that the prescribed medication is being dispensed according to schedule.

The control element 50 also includes a second operative sequence 66 that, in association with the external input devices (modem 30/key input 58/speech recognition 56), receives and interprets one or more medication delivery commands received from an external source, such as the patient or the central facility 28. As shown in FIG. 13, the second operative sequence 66 conducts a validity check upon the command. The second operative sequence 66 also checks to determine what type or category of medication is being requested.

Upon receipt of a valid command or commands requesting the proper type of medication, the second operative sequence 66 generates the second control signal 54. The medication retained in the second storage compartment 106, but not the first storage compartment 104, is thereby released to the patient.

The second operative sequence 66 also preferably communicates an appropriate "Can Administer" message to the patient through one or more of the output devices 60/62. If the medication request originates from the patient, an advisory message may also be sent to the central facility 28 via the modem 30 at the time an "on demand" request is received and implemented.

If an invalid command is received, or if the patient requests a medication that can only be administered according to an internal command from the internal memory, an appropriate "Cannot Dispense" message is display and/or spoken using the output devices 60/62.

Preferably, whenever a decision is made to either dispense medication or withhold medication, the decision is recorded in internal memory 26 for record keeping purposes.

The first delivery mechanism 114 is thereby actuated in response to an internally generated command signal, but not in response to an externally generated command signal. The first category of medication can thus be safely retained within the first storage compartment 104 away from patient access, except as controlled by the control element 50 (via the first control signal 52). Strict compliance with the prescribed medication schedule is assured.

The second delivery mechanism 116 is actuated in response to the second control signal 54 based upon externally received commands. The second category of "on demand" medication can thus be safely retained in the second storage compartment 106 for administration externally controlled by the patient or the central facility 28 by issuing a proper external command.

In the illustrated and preferred embodiment shown in FIG. 13, the control element 50 also includes a third operative sequence 68 that maintains a real time record of "on demand" administrations of medication and the elapsed time period between them. The third operative sequence 68 includes timing means 70 for comparing the elapsed time between one actuation and the next subsequent actuation command to a prescribed fixed interval. The third operative sequence 68 will, based upon the output of the timing means 70, prevent the next subsequent actuation of the second delivery mechanism 116, despite the receipt of a valid medication command, when the elapsed time period is less than the prescribed period.

In the illustrated and preferred embodiment, the third operative sequence 68 also informs the patient through an appropriate "Cannot Administer" message via one or more of the output devices 60/62. In addition, an advisory message can also be transmitted to the central facility 28 via the modem 30. In this way, the system guards against mismedication or overuse of the "on demand" category of medication.

The system 100 is thereby capable of storing and administering different categories of medication contained in individually sealed blister packs according to different administration criteria.

It should be appreciated that all of the medication delivery systems described in this Specification are applicable for use out of association with a patient monitoring and assistance device. The systems can be used in virtually any environment where storage and delivery of selective medications are desired, such as in a hospital, nursing home, or pharmacy. It should also be appreciated that the medication delivery systems described can be actuated and controlled manually, without reliance upon the automated and highly interactive microprocessor controlled systems described in this Specification. Furthermore, each delivery mechanism and associated storage compartment can be used individually as a single unit, as well as in the multiple configurations shown in this Specification.

The features of the many aspects of the invention are set forth in the following claims.

We claim:

1. A dispensing device for medication prepacked in sealed containers comprising wall means defining a storage compartment for holding at least two of the medication containers in a vertically stacked orientation, one above the other, that includes an upper-most container and a lower-most container, the wall means including an upper wall movable between a closed position covering the storage compartment and an opened position for loading medication containers into the storage compartment, a lower wall for engaging the bottom-most container loaded within the storage compartment and being movable in a vertical path toward and away from the upper wall, a side wall having a discharge opening adjacent the upper wall, a push member movable in a horizontal path that is transverse the vertical path of the lower wall and that is aligned with the discharge opening, the push member being movable in its horizontal path between a first position spaced from the discharge opening and a second position adjacent the discharge opening, spring means for continuously urging the lower movable wall toward the upper wall to thereby urge the stack of containers toward the upper wall and, when the upper wall is in its closed position, for holding the upper-most container against the upper wall in alignment with the discharge opening, means for reciprocating the push member between its first and second positions, the push member being operative, when moved from its first position toward its second position, for ejecting the then upper-most container from the compartment through the discharge opening, and, when moved from its second position toward its first position, for allowing the next upper-most container to be urged against the upper wall into alignment with the discharge opening in response to the spring means, and means for interrupting movement of the push member toward its second position when push member movement is impeded.

2. A dispensing system for medication prepacked in sealed containers comprising a housing, means in the housing for removably receiving at least one medication dispensing device as defined in claim 1, and system control means associated with the received dispensing device for actuating the reciprocating means according a predetermined medication criteria.

3. A dispensing system for medication prepacked in sealed containers comprising a housing, means in the housing for removably receiving at least two medication dispensing devices, each medication dispensing device comprising wall means defining a storage compartment for holding at least two of the medication containers in a vertically stacked orientation, one above the other, that includes an upper-most container and a lower-most container, the wall means including an upper wall, a side wall having a discharge opening adjacent the upper wall, a push member movable in a horizontal path that is aligned with the discharge opening, the push member being movable in its horizontal path between a first position spaced from the discharge opening and a second position adjacent the discharge opening, spring means for continuously urging the stack of containers toward the upper wall and for holding the upper-most container against the upper wall in alignment with the discharge opening, and means for reciprocating the push member between its first and second positions, the push member being operative, when moved from its first position toward its second position, for electing the then upper-most container from the compartment through the discharge opening, and, when moved from its second position toward its first position, for allowing the next upper-most container to be urged against the upper wall into alignment with the discharge opening in response to the spring means, and system control means associated with the first and second dispensing devices for actuating the reciprocating means associated with the first dispensing device in response to a first medication criteria and for actuating the reciprocating means associated with the second dispensing device in response to a second medication criteria different from the first medication criteria.

4. A system according to claim 3 wherein the upper wall is movable between a closed position covering the storage compartment and an opened position for loading medication containers into the storage compartment.

5. A system according to claim 3 and further including means for interrupting movement of the push member toward its second position when push member movement is impeded.

6. A dispensing device for medication prepacked in sealed containers comprising wall means defining a storage compartment for holding at least two of the medication containers in a vertically stacked orientation, one above the other, that includes an upper-most container and a lower-most container, the wall means including an upper wall, a side wall having a discharge opening adjacent the upper wall, a push member movable in a horizontal path that is aligned with the discharge opening, the push member being movable in its horizontal path between a first position spaced from the discharge opening and a second position adjacent the discharge opening, spring means for continuously urging the stack of containers toward the upper wall and for holding the upper-most container against the upper wall in alignment with the discharge opening, means for reciprocating the push member between its first and second positions, the push member being operative, when moved from its first position toward its second position, for ejecting the then upper-most container from the compartment through the discharge opening, and, when moved from its second position toward its first position, for allowing the next upper-most container to be urged against the upper wall into alignment with the discharge opening in response to the spring means, and means for interrupting movement of the push member toward its second position when push member movement is impeded.

7. A device according to claim 6 wherein the upper wall is movable between a closed position covering the storage compartment and an opened position for loading medication containers into the storage compartment.

* * * * *